(12) United States Patent
Blais

(10) Patent No.: US 6,271,918 B2
(45) Date of Patent: *Aug. 7, 2001

(54) VIRTUAL MULTIPLE APERTURE 3-D RANGE SENSOR

(75) Inventor: François Blais, Orleans (CA)

(73) Assignee: National Research Council of Canada, Ottawa (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/244,207

(22) Filed: Feb. 4, 1999

(51) Int. Cl.[7] .................................................. G01B 11/24
(52) U.S. Cl. .............................................................. 356/376
(58) Field of Search ........................ 356/376; 306/3.13, 306/3.14, 3.15, 9, 12

(56) References Cited

U.S. PATENT DOCUMENTS

| Re. 35,816 | * | 6/1998 | Schilz | 356/376 |
|---|---|---|---|---|
| 4,842,411 | * | 6/1989 | Wood | 356/376 |
| 4,937,445 | * | 6/1990 | Leong et al. | 356/376 |
| 5,168,327 | * | 12/1992 | Yamawaki | 356/376 |
| 5,270,795 | | 12/1993 | Blais | 356/375 |
| 5,911,126 | | 6/1999 | Massen | 702/153 |

* cited by examiner

*Primary Examiner*—Richard A. Rosenberger
(74) *Attorney, Agent, or Firm*—Freedman & Associates

(57) ABSTRACT

A 3-D range sensor for measuring range from the sensor to a target surface by imaging a plurality of points projected onto the target surface is disclosed. The range sensor comprises an optical system for imaging a first image and a second other image of each of the plurality of points on the target surface, whereby the second other image is obtained from a different predetermined location than the first image. The optical system comprises an optical medium for combining the first image and the second other image, at least a reflective means for imaging at least one of the first and the second other image and for reflecting it to the optical medium such that the first image and the second other image are combined and a converging lens system for focussing the first image and the second other image. A position sensitive light detector detects the focussed first image and the focussed second other image. Using a processor, a distance between the detected first image and the detected second other image is determined and based on the determined distance and a known spatial relation between the first and the second other image the range is then calculated.

22 Claims, 8 Drawing Sheets

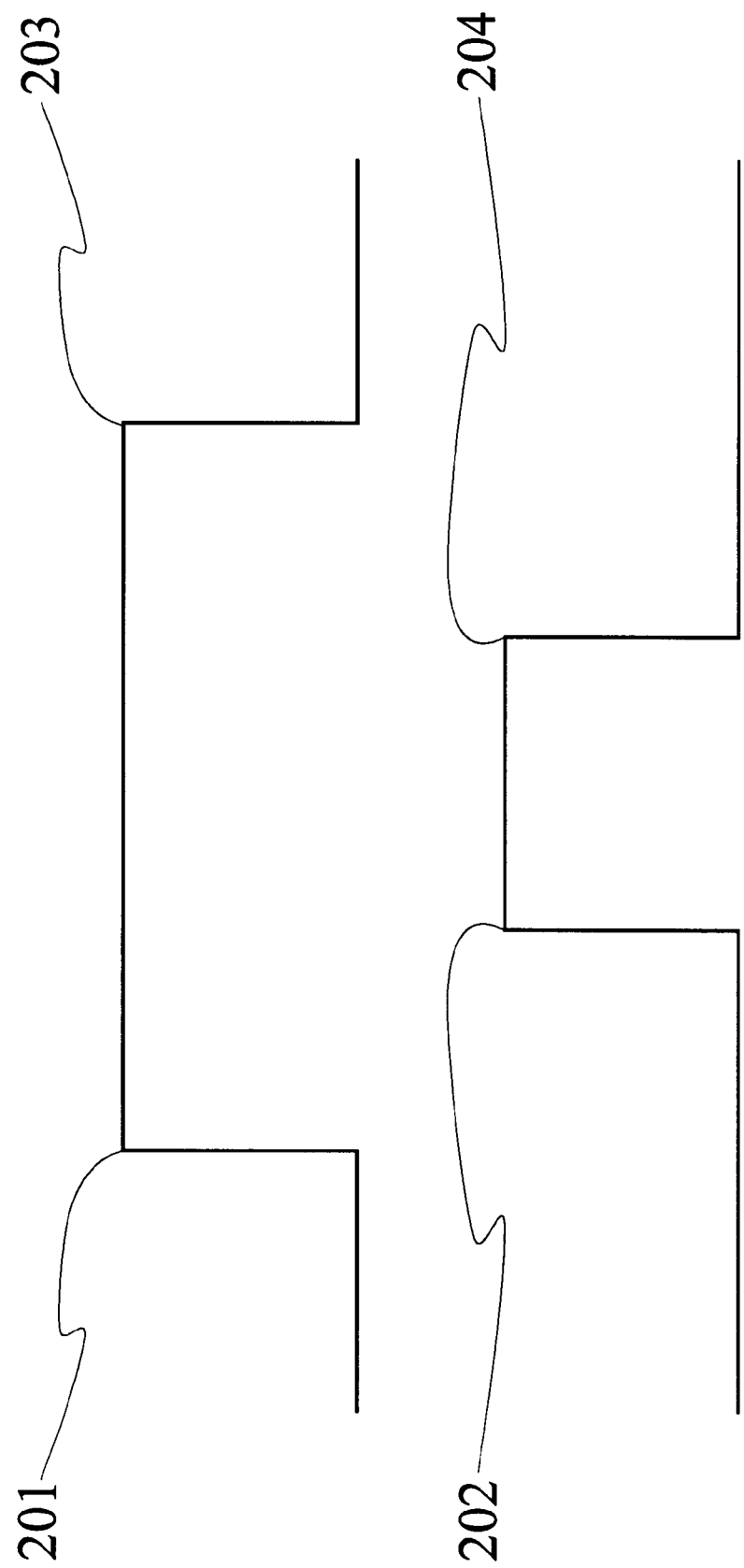

VIRTUAL MULTIPLE APERTURE 3-D RANGE SENSOR

FIELD OF THE INVENTION

The invention relates to a 3-D range sensor for optical ranging of points on a target surface and in particular a 3-D range sensor employing redundancy to validate a range measurement and enhance reliability.

BACKGROUND OF THE INVENTION

Two popular techniques currently in use for optical ranging of a target surface are known, respectively, as the standard optical triangulation system and the Biris (bi-iris) system, the latter employing an apertured mask in a converging lens system of an imaging device having a position sensitive detector, e.g. a CCD camera.

Essentially, in order to determine a distance to a point within an image a triangle is formed with the point at a vertex thereof. Another corner of the triangle is formed by a detector, commonly a CCD imaging device. By knowing some of the dimensions of the triangle, a distance from the detector to the point within the image can be determined. This is referred to as triangulation.

A known method of triangulation requires two detectors for imaging a scene. Each image is analysed to extract a same feature. The two detectors and the feature form the three angles of a triangle and triangulation is performed. Known problems with such a system include computational complexity, feature extraction problems, and perspective related problems which can reduce accuracy.

Another common approach to triangulation uses only a single detector and a laser. The laser shines a target in the form of a dot of known colour onto a surface and the detector images the dot. The detector, laser, and dot form the angles of a triangle. Though such a system is useful in controlled environments, when one tries to use it in uncontrolled environments, noise and other issues prevent accurate measurement of distances.

These systems are described and compared in F. Blais et al. (88), i.e. "Practical Considerations for a Design of a High Precision 3-D Laser Scanner System", published in Opto-mechanical and Electro-optical Design of Industrial Systems, SPIE Vol. 959, 1988, pp 225–246, and also in F. Blais et al. (91), i.e. "Optical Range Image Acquisition for the Navigation of a Mobile Robot", published in the Proceedings of the 1991 IEEE International Conference on Robotics and Automation, Sacramento, Calif., Apr. 9–11, 1991. The Biris system had previously been reported by M. Rioux et al. (86) in "Compact Three-Dimensional Camera For Robotic Applications", published in the Journal of the Optical Society of America A, Vol. 3, p 1518, September 1986, and in M. Rioux U.S. Pat. No. 4,645,347 issued Feb. 24, 1987. The herein referenced documents are hereby incorporated by reference.

The Biris system uses a laser to form a target as well as a dual iris detector for forming an image with two separately imaged views of the target. This permits verification of target position and increased accuracy. An advantage of the Biris system is its small size and the robustness of the range sensor. The Biris system is better than the above triangulation systems, because it uses the redundancy introduced by an apertured mask to validate the measurements and to compensate for small errors introduced into range measurements due to detector resolution. For example, such a system is disclosed in U.S. Pat. No. 5,270,795 issued in 1993 to Blais and is incorporated herein by reference. More recently, an anamorphic lens system has been used that increases the field of view without compromising accuracy as is disclosed in: F. Blais, J. A. Beraldin, "Calibration of an anamorphic laser based 3-D range sensor" Videometric V, SPIE Proc. 3174, San Diego, Jul. 30–31, 1997, pp 113–122.

Unfortunately, new generations of CCD and CMOS image detectors are smaller due to new technologies that reduce production costs. For example, at present most newly released CCDs measure ⅓" to a side compared to ⅔" of the former generation. To obtain the same field of view with a ⅓" CCD image detector as with a ⅔" CCD image detector a lens of half the focal length is needed. Because the lens size is reduced, the overall aperture sizes are also reduced. This results in two apertures having little spacing therebetween and allowing less light to pass therethrough. Furthermore, the contribution of the Biris, the aperture spacing, to the triangulation is negligible due to a very small separation of the two apertures. This makes the method prone to false measurements.

It is well known in the art to use a beam splitter for range measurements. For example, in "Modern Optical Engineering", Second Edition, by Warren J. Smith published by McGraw-Hill, 1990 pp. 254–257 range measurement using a beam splitter is discussed. Two different images of a single feature are superimposed on a screen, for example. The superposition is performed using a beam splitter or semi-transparent mirror This allows viewing of the feature from two different "locations" a greater distance apart compared to the Biris system. The two images of the feature are then adjusted so that the feature overlaps itself. Commonly, the images are adjusted by adjusting the angle two mirrors, one in each optical path. Once the feature is coincident on the screen, a triangle is known between the mirrors and the feature. This system provides a greater base for triangulation increasing accuracy of the range measurement. Unfortunately, commonly a human operator is used to overlap the image. Even when automated, since feature extraction is a difficult process, the accuracy of such a system reduces to a the accuracy of a known stereoscopic triangulation system with the same drawbacks.

It is therefore an object of this invention, to provide a range sensor that is highly accurate and reliable. This is accomplished by using a beam splitter to provide a plurality of images of a target point on a surface, each image relating to a triangle having a different triangle base for use in triangulation of target point than the other images in order to reduce a number of false measurements and increase overall accuracy.

It is further an object of this invention, to provide a range sensor that is compact and inexpensive to manufacture by using commonly available low cost imaging components.

SUMMARY OF THE INVENTION

According to the present invention there is provided a range sensor for measuring a range from the range sensor to a target point on a surface comprising:

a light source for projecting a target at the target point on the surface;

a first detector for capturing a first image;

a second detector for capturing a second other image;

a first optical path for providing the first image of the target point to the first detector the first image provided from a first viewing angle;

a second optical path for providing a second image of the same target point to the second detector from a different viewing angle;

a processor for determining a distance measurement in dependence upon the two captured images, the distance measurement determined using at least two imaged target points, imaged target point positions used to determine a range measurement, the processor for validating the determined range measurement.

In accordance with the invention there is also provided a range sensor for measuring a range from the range sensor to a target point on a surface comprising:

a light source for projecting a target at the target point on the surface;

a detector for capturing an image;

a lens for focussing the first image and the second other image onto the detector;

a first optical path having a first optical axis for providing the first image of the target point to the detector the first image provided from a first viewing angle;

a second optical path having a second different optical axis for providing a second image of the same target point to the detector from a different viewing angle;

a processor for determining a distance measurement in dependence upon a captured image, the distance measurement determined using at least detected target points.

Preferably, the range sensor as defined in claim 6 wherein the processor comprises means for validating the determined range.

According to the present invention there is provided a method for measuring range from a range sensor to a target surface comprising the steps of:

projecting a target from a source onto the surface;

using a detector, imaging the target through two different optical paths, each optical path having a different optical axis; and determining the distance to the surface based on the location of the source, the location of the detector, and the images of the target, the distance determined using triangulation.

An embodiment comprises the validation steps of:

detecting target point positions within an image captured with the detector;

selecting a first detected target point position;

determining from the first detected target point position a corresponding position of another detected target point, the corresponding position of a target point imaged along a different optical path and relating to an approximately same determined range measurement;

determining a presence or absence of a target point at the corresponding position; and, when a target point is detected at the corresponding position, determining a range measurement from the two corresponding target point positions and validating the determined range measurement.

An embodiment comprises the validation steps of a) detecting target point positions within an image captured with the detector;

b) selecting a first detected target point position;

c) determining from the first detected target point position a corresponding position of another detected target point, the corresponding position of a target point imaged along a different optical path and relating to an approximately same determined range measurement;

d) determining a presence or absence of a target point at the corresponding position;

e) when a target point is detected at the corresponding position, determining a range measurement from the two corresponding target point positions and validating the determined range measurement; and, when no target point is detected at the corresponding position, selecting a new first target point position and repeating steps (c), (d) and (e).

Essentially, the invention relies on imaging at least one target point at least two times in an asymmetric fashion. Prior art devices, such as BIRIS, image a point through two apertures that are symmetric about an axis of a lens through which imaging occurs. The present invention captures two or more images of target point of light projected onto a surface, the two or more images formed through a lens which are not in a predetermined symmetric relation to each other. In this fashion, a significant distance for triangulating between two different range measurements is provided. The quality of range measurement verification is improved through increased distance for triangulating between the two different range measurements.

Also, the invention provides for a method of merging two or more images onto a single image space. Though it is known to merge images for Biris, Biris is not well suited to use with small CCDs. The use of merged images for performing range sensing decreases hardware complexity and costs while requiring validation of range measurements to ensure that a sensed distance is valid. Alternatively, two separate images are used for performing the same validation function. The validation algorithm is significantly simpler since it is known which optical path relates to a detected peak; however, because of manufacturing tolerances and wear on a detector, the use of two detectors is not preferred. The system, having more components, is less reliable and more prone to problems due to mis-calibration.

BRIEF DESCRIPTION OF THE DRAWINGS

Exemplary embodiments of the invention will now be described in conjunction with the drawings in which:

FIG. 2b illustrates an output from a detector according to the invention in the form of an image having two sets of peaks therein one set of peak positions relating to a scaled view of the target points relative to the other;

DETAILED DESCRIPTION OF THE INVENTION

The quality of a range measurement is related to its reliability, accuracy, and precision. When an optical range sensor is used, the precision of any measurement is related to the resolution of the optical sensor. An image of a line captured with a detector results in a number of points side by side, where the number is based on the resolution of the detector. A larger number of points side by side is captured by a detector having a higher resolution. A smaller number of points is captured by a detector having a lower resolution.

Taking a plurality measurements of a range increases reliability and accuracy of the range measurement derived from the plurality of measurements. This is because a plurality of measurements substantially in agreement with each other increase reliability and a number of measurements allows averaging of error within each measurement.

Figures 1, 1B:
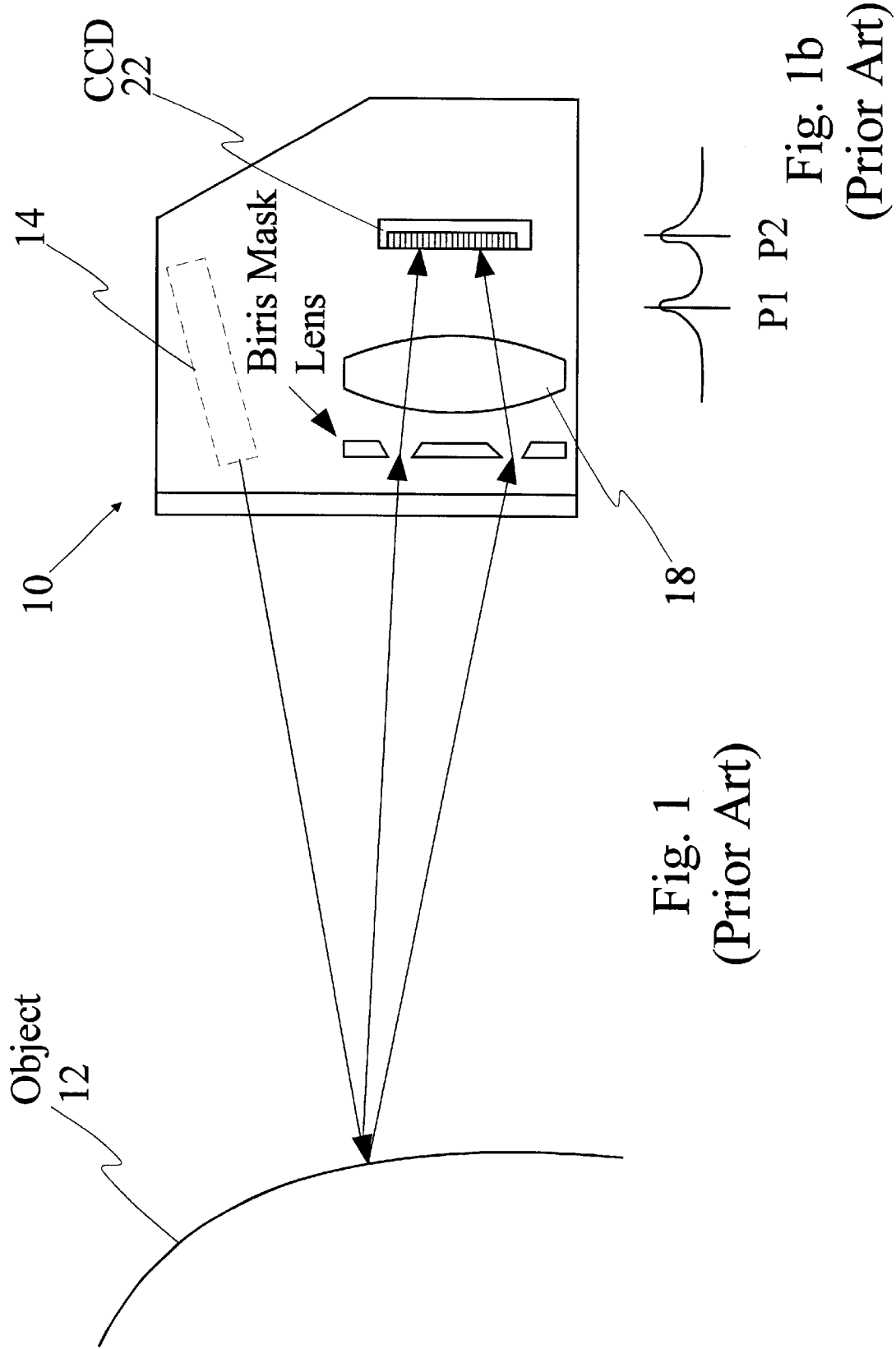
FIG. 1 illustrates a prior art range sensor based on the Biris principle.
FIG. 1b illustrates an output from a detector according to the prior art and having two peaks therein.

Referring to FIG. 1a prior art range sensor 10 for measuring a range from the sensor 10 to a target surface 12 is shown. A laser 14 projects a target point onto the target surface 12. A double aperture or Biris mask 16 in combination with a converging lens system 18 creates a doubled image of the target point on a detector in the form of a CCD 22. The output signal of the CCD 22, shown in FIG. 1b, across a scan line includes two peaks P1 and P2. The distance between the two peaks P1 and P2 is related to the range from the sensor 10 to the target surface 12. The location of each of the two peaks is determined using sub pixel peak detection. Once the locations are determined, a distance between the peaks is calculated. After the distance has been determined the range is calculated using triangulation. Sub pixel peak detection is well known in the art (See for example U.S. Pat. No. 4,819,197 entitled Peak detector and imaging system in the name of Blais and U.S. Pat. No. 4,658,368 entitled Peak position detector in the name of Blais both hereby incorporated by reference).

In triangulating the measurements obtained using a Biris system, three triangle bases are available, D1, D2, and d. A major drawback to Biris systems is dependence of range accuracy $\Delta z$ on the pixel size $\Delta p$ of the detector and the triangulation base D as shown in equation 1, $$\Delta z = (z^2/(f*D))*\Delta p \quad (1)$$

where z is the range from the sensor 10 to the target surface 12 determined for a given triangulation base D (See D1, D2, and d in FIG. 1) and f is the focal length of the lens 18. To increase the accuracy of the range sensor 10 either the focal length f or the triangulation base D has to be increased. Unfortunately the value of f is related to the field of view and to the physical CCD size. A common field of view is about 30°. Cost considerations result in a choice of a small CCD. Since a field of view, $\phi$ is defined as follows:

$$\Phi = 2*\tan(CCD\_size/(2*f)) \quad (2)$$

and it is preferable to maintain a reasonably wide field of view, as CCD size is decreased, f must also be decreased. Reducing f results in increased values for $\Delta z$. Therefore, with reduced CCD size, it is important to increase the triangulation base D.

A value of $\Delta z$ is determined for each of D1, D2, and d and then an overall $\Delta z$ is approximated as follows:

$$\Delta z = \sqrt{\frac{\Delta z_1^2 + \Delta z_2^2 + \Delta z_3^2}{3}} \quad (3)$$

where 3 is a number of values of $\Delta z$ and therefore can be generalised to N. From the above equations, it is clear that a large number of triangulation measurements, each having a large base results in a small value of $\Delta z$. Unfortunately for Biris systems with very small CCDs, the spacing d becomes so small that using a measurement determined with that base increases $\Delta z$ significantly. Furthermore, the contribution of the Biris to the triangulation between two different range measurements is negligible due to a very small separation of the two apertures making the method prone to false measurements. Augmentation of the triangulation base using standard triangulation with the Biris method is disclosed in U.S. Pat. No. 5,270,795 issued in 1993 to Blais incorporated herein by reference.

Figure 2:
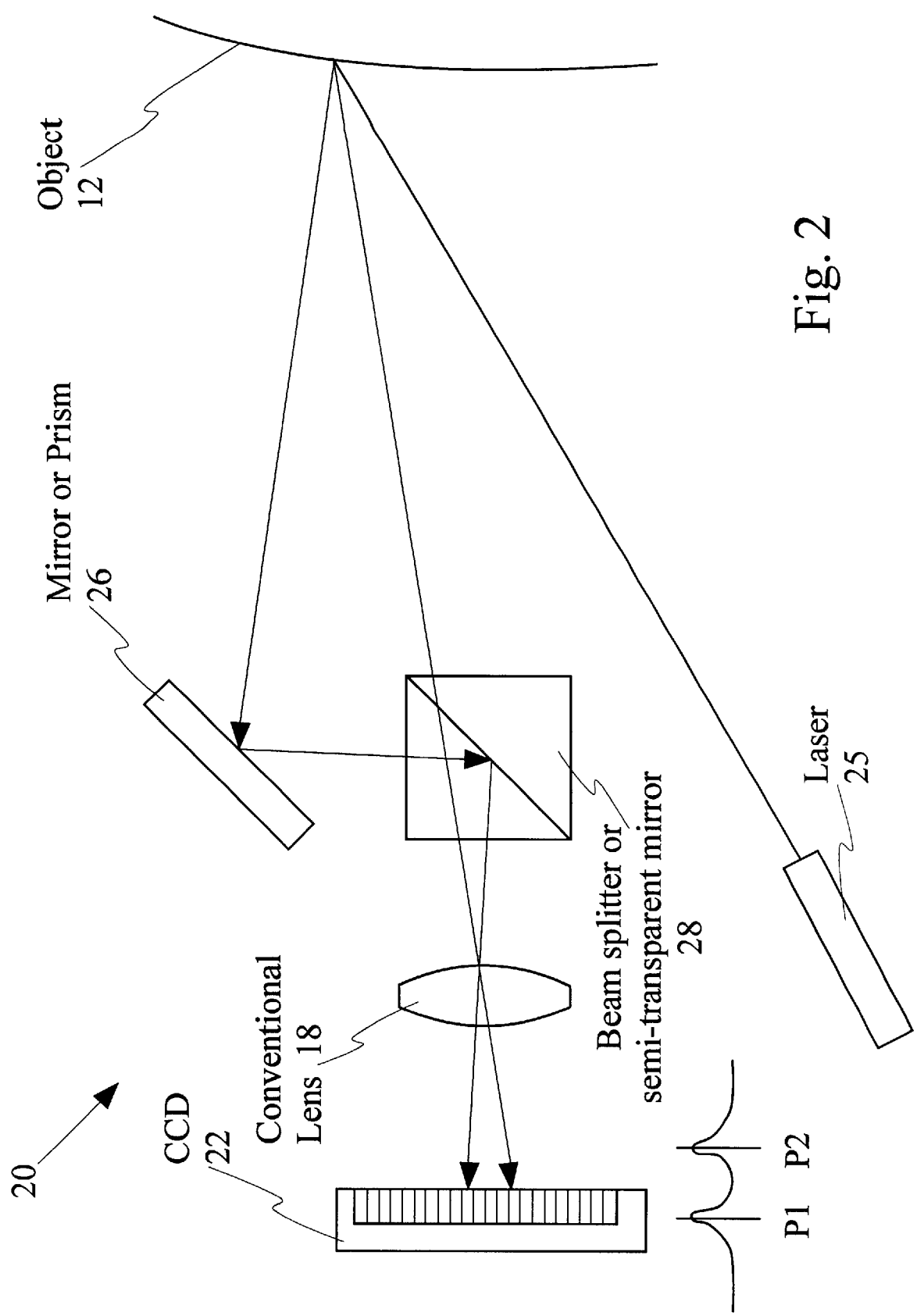
FIG. 2 illustrates a range sensor according to the invention.

Referring to FIG. 2, a 3-D range sensor 20 according to the invention is shown. A light source 25 in the form of a laser projects one or more target points in the form of one or more points of light, for example, a single line, multiple parallel lines or a pattern such as a 2-D grid onto a surface 12. A detector 22 in the form of a CCD or a CMOS detector is disposed to receive light from the target point via at least two different optical paths. The first optical path is shown in FIG. 2 as a straight line from the target point to the detector 22 passing through a beam splitter 28 and a lens 18. The second other optical path is shown as a line from the target point to reflective surface 26 in the form of a mirror or a prism. Light incident on the reflective surface is reflected to the beam splitter 28 and from there through the lens 18 to the detector 22. Thus, the detector captures two coincident images of the target point, one along each of the two optical paths. The beam splitter 28 comprises a semi-transparent mirror. Of course, other beam splitters are well known in the art. Alternatively, the optical paths are guided using other components so as to be coincident upon the detector. The lens 18 is commonly a converging lens but, any suitable lens or focusing device including a pin hole lens may be used. Advantageously, a conventional low cost camera/lens system is sufficient to ensure accuracy of the range measurements.

The two optical paths result in detection of two images of the target point each captured from a different viewing angle resulting in a range sensor equivalent to a stereoscopic vision system. Referring to FIG. 1b, a graph of an output signal of a detector is shown wherein images of the points are indicated by two peaks P1 and P2. For a Biris system, these peaks are located within a single scan line of a captured image. Unfortunately, due to asymmetry and scaling effects of the present invention, two corresponding peaks are not necessarily within a same scan line. Referring to FIG. 2b, a detected image of a line projected onto a cube is shown. The line is imaged twice according to the invention but the two images show the cube with differing scale. Determination of corresponding target points and determination of false measurements is important for use in such a system. Once two corresponding points that represent valid range data are determined, a range is determined therefrom having increased reliability due to the significant distance d.

A range sensor according to the invention is highly advantageous providing accurate and reliable range information due to the use of two distinct triangulation bases. Also, cost advantages result from the use of a single small size CCD detector. Use of the beam splitter 28 allows the system to obtain two images of a target point from two different viewing angles, whereby the two different viewing angles enclose a sufficient angle to provide a large base for triangulation between two different range measurements and, therefore, increase accuracy and reliability of a resulting range measurement. Projection of a plurality of points onto the target surface in combination with the method for processing the images according to the invention, provides further redundancy to the range measurement process. According to the invention, a number of false measurements due to other light sources or multiple reflections on the target surface that can not be filtered is substantially reduced.

The present invention also provides increased lens aperture compared to the two small mask apertures of the Biris system. Therefore, substantially more light is provided to the detector 22 and signal sensitivity is thereby increased. Furthermore, existing signal processing algorithms such as algorithms for peak detection are applicable for use according to the invention. Of course, the cost and size advantages to using a single CCD of very small size in order to determine a range that is accurate is evident The present invention allows for implementation of a low cost accurate range sensing system that is robust and useful in many environments.

The present invention allows use of a conventional camera lens even one with a very short focal length or a low cost fixed focus lens CCD/CMOS device. No aperture is required. Implementations of the invention can also benefit from less expensive smaller integrated CCD devices and advances in CCD technologies.

Figure 3:
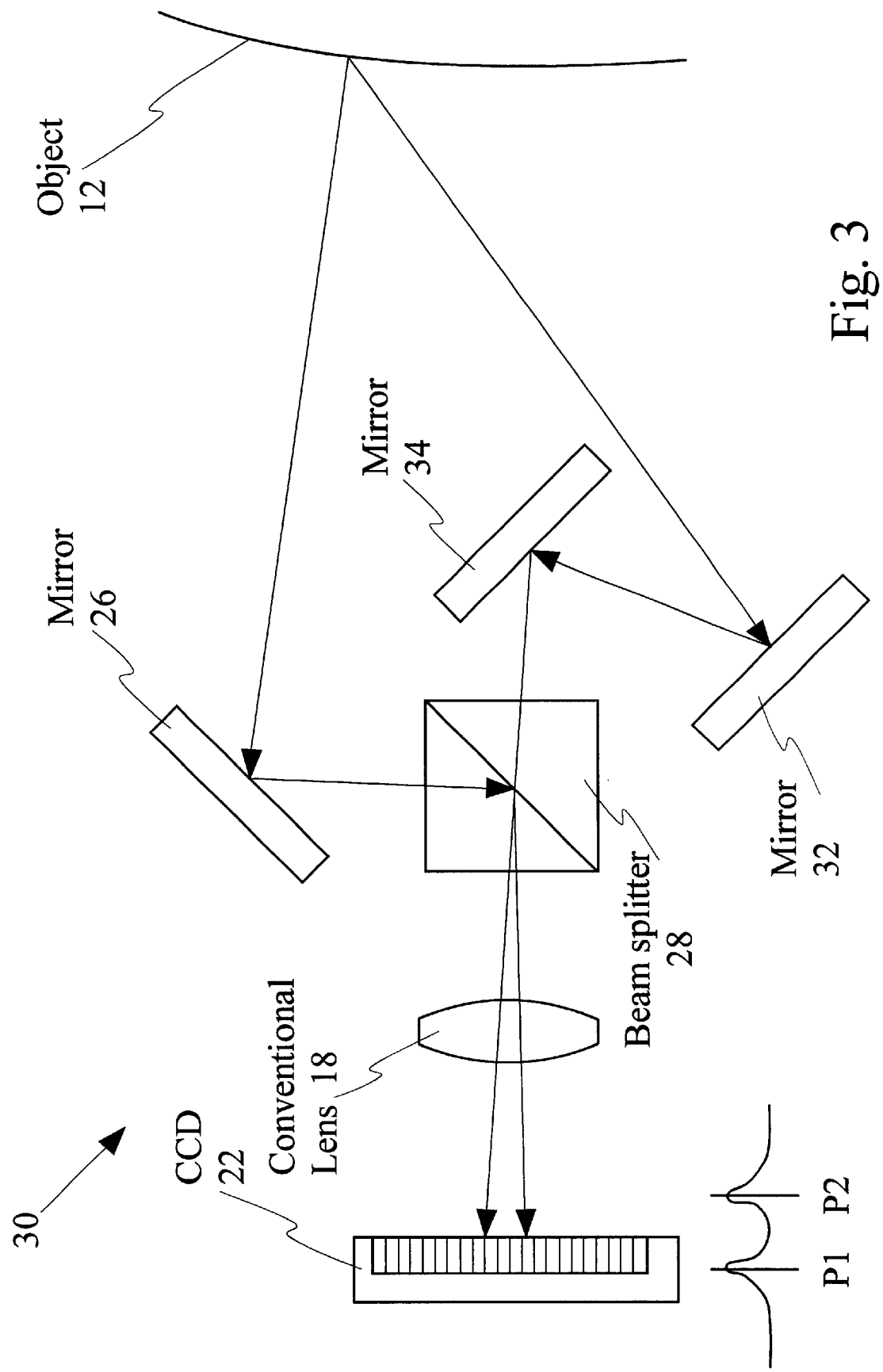
FIG. 3 illustrates another embodiment of a range sensor according to the invention.

Referring to FIG. 3 another embodiment of a 3-D range sensor according to the invention is shown. The range sensor 30 is similar to the one shown in FIG. 2 but comprises two additional mirrors 32 and 34. The mirrors 32 and 34 extend a distance traveled by light along the first optical path such that the distance is approximately the same as a distance traveled by light within the second other optical path. Therefore, the light in each optical path travel a same distance reducing scaling effects such as those shown in FIG. 2b.

It is advantageous to reduce scaling effects in some instances in order to increase system accuracy. An image of a target point that is further away is smaller than an image of the same target point when it is closer. Because a detector commonly detects an image in the form of a 2D array of pixels, the smaller the image of the target point, the fewer pixels effected. In order to accurately determine peak location, a larger image of a target point is preferred. Therefore, reducing of scaling effects allows for selection of appropriate optics to ensure that target point images are of suitable size for accurate peak detection. Often, elimination of scaling effects results in increased overall cost. This is acceptable in many range sensing applications.

Figure 4:
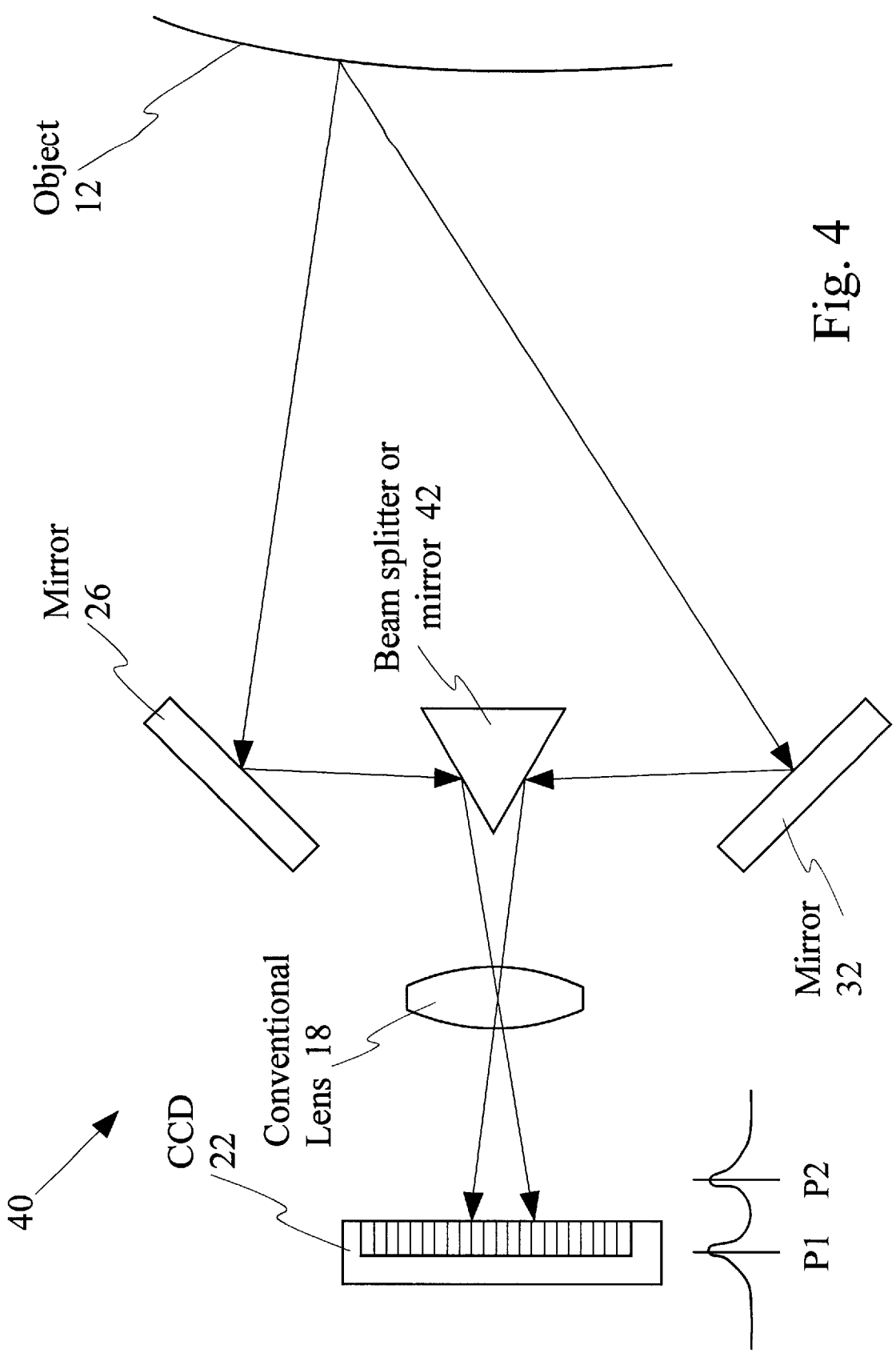
FIG. 4 illustrates yet another embodiment of a range sensor according to the invention.

Another embodiment of a range sensor according to the invention is shown in FIG. 4. The range sensor 40 comprises a first optical path and a second optical path reflecting off mirrors 32 and 26 respectively. Each optical path is also reflected from a dual reflector 42 in a same direction through lens 18 onto detector 22. The dual reflector 42 comprises two mirrors disposed in a wedge shaped fashion or a prism. Such a system is symmetrical and reduces overall scaling issues. This is advantageous for some uses.

Figure 5:
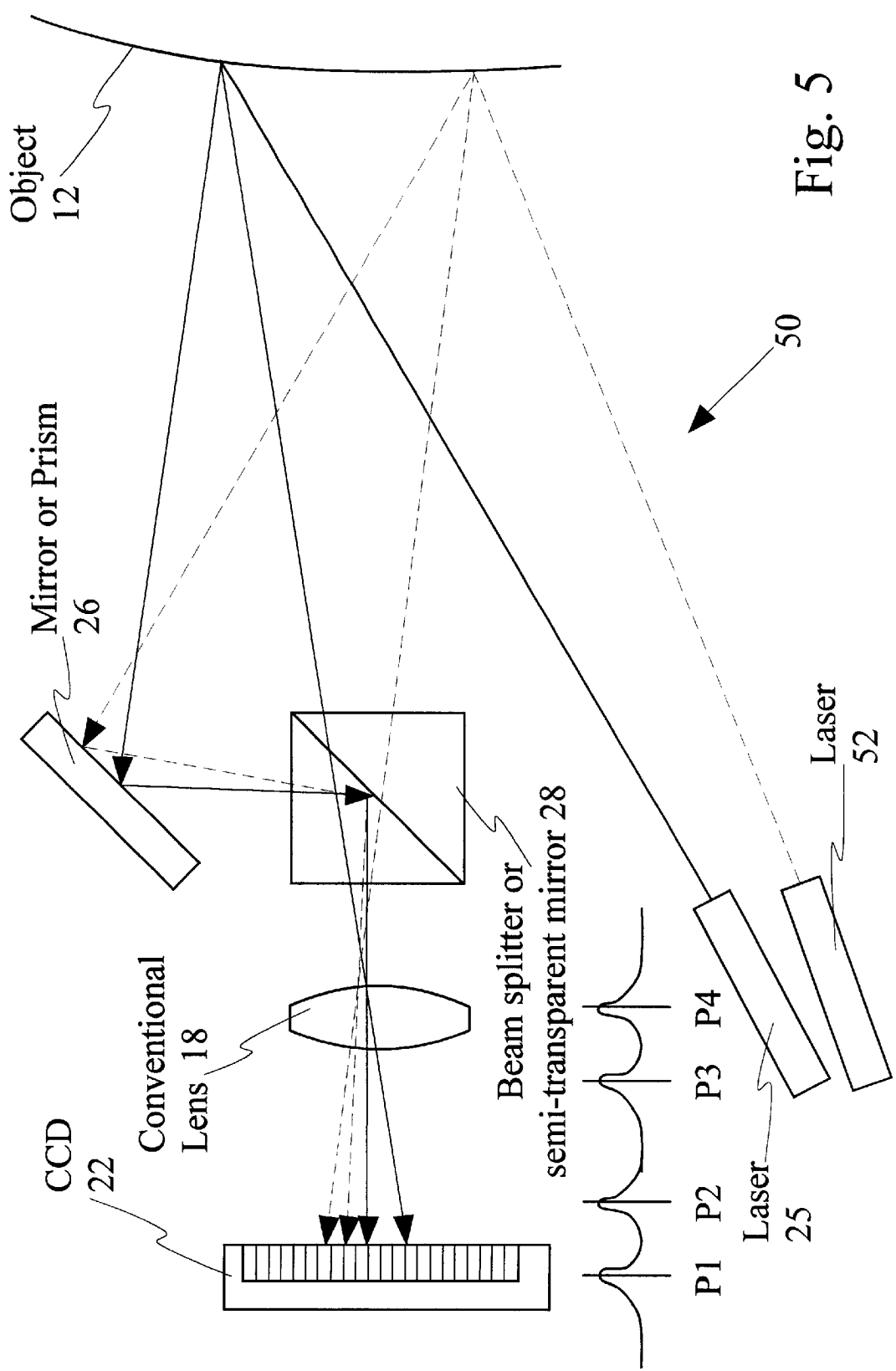
FIG. 5 illustrates a range sensor according to the invention, whereby a plurality of points is projected onto the target surface by two laser projectors; and, FIG. 6 illustrates another embodiment of a range sensor according to the invention, wherein three different images of each of a plurality of points are captured.

Using projection of multiple laser points, as shown in FIG. 5, allows an increase in the number of simultaneous measurements. The range sensor 50 according to the invention is similar to the one shown in FIG. 2 but has an additional laser 52 for projection of another one or more target points. A first and a second other image of each set of the other target points results in four peaks P1, P2, P3 and P4 in the output signal of the detector 22. Projection of multiple lines or a pattern such as a 2-D grid pattern allows simultaneous measurement of range to each of a plurality of target point locations on a target surface. Optionally, a target surface area is scanned with projected lines to increase the density of range measurements.

Figure 6:
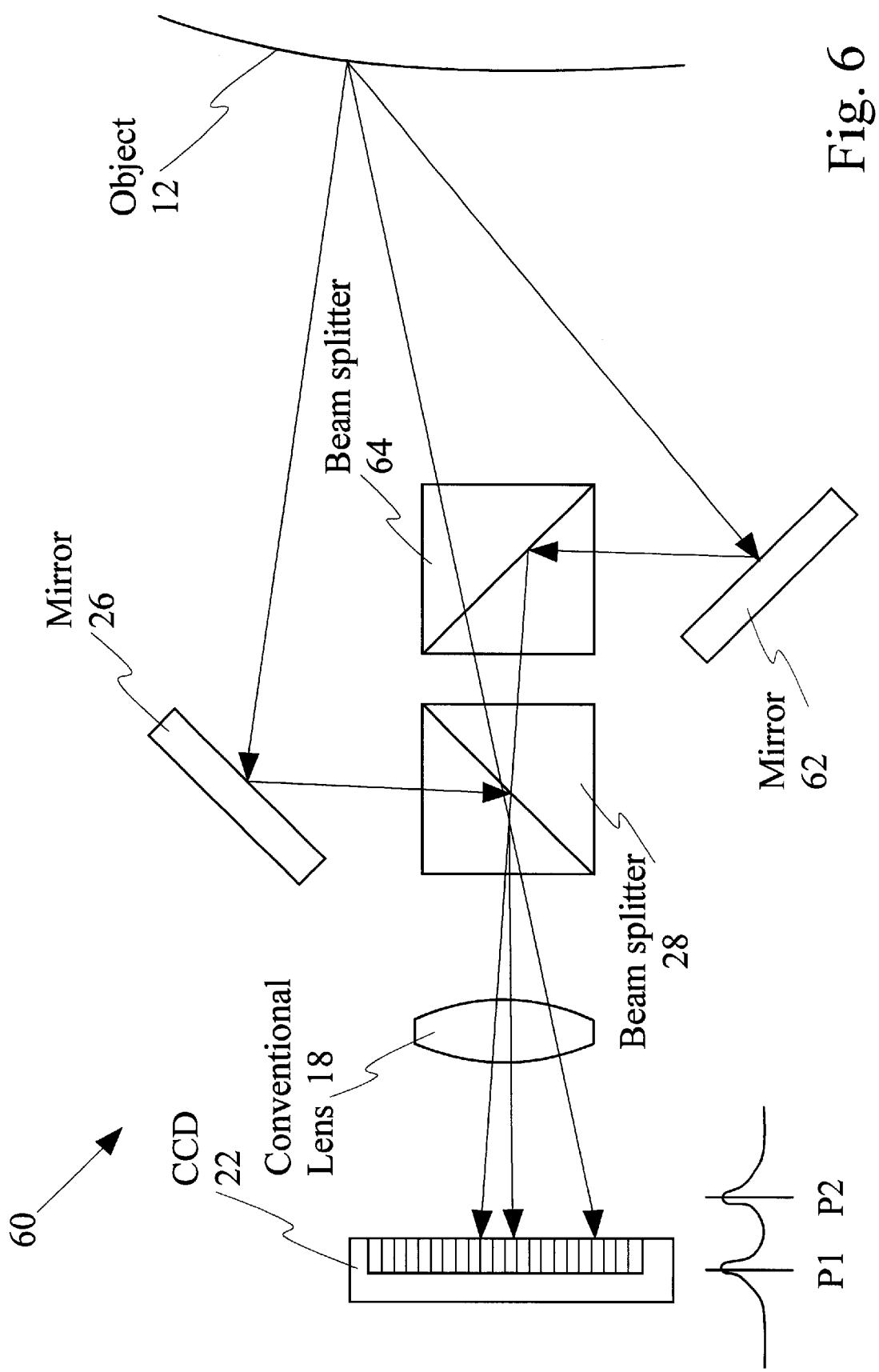

In the embodiment according to the invention shown in FIG. 6, a third other image of a target point is obtained. The range sensor 60 comprises the elements of range sensor 20, an additional mirror 62 and an additional beam splitter 64. A third optical path passing through both beam splitters 64 and 28 is formed. This results in a third other image of the target point coincident on the detector 22. This embodiment further reduces the number of false measurements and increases the accuracy of the range measurements because of the third optical path. Optionally, diffractive optics and/or gratings are used to obtain the different optical paths.

As noted above, increased accuracy results from a plurality of different range measurements to a same location on a surface, each range measurement based on a different triangle. Increased reliability results from automatic distinction between "real" range data and "false" range data. This process of distinguishing is herein referred to as validation.

Validation is used to discriminate between peaks for use in determining measurements and for use in determining other peak positions relating to a same surface location and, therefore, for use in determining a same range measurement. This allows filtering of peaks resulting from ambient illumination, other light sources, and multiple reflections on a target surface. The validation method according to the invention consists of finding a set of peaks in the form of a pair of peaks $Pi,v$; $Pj,w$ for a given set of peak positions $Pi,v$ that minimises the equation $$\min\ (\xi^2_{i,j})\forall i,j \qquad (4)$$

wherein $$\epsilon_{i,j}=Pi,v-F_v[Pj,w] \qquad (5)$$

$$w=G(Pi,v) \qquad (6)$$

with $F_v$ and $G$ being validation functions. Of course, when a detector forms more than two images of a target point, a search is performed for a set having more than two peak positions therein.

The method of validation is dependent on certain known characteristics of a range sensor according to the invention. First, with a single image of a single point, a range is determinable and, therefore, it is evident that for each peak position there is a single unique range measurement. Since two images are superimposed, for each peak there exists two possible range measurements depending on which optical path the peak is associated with.

Once a device according to the invention is characterised, a one to one correlation exists for peak position sets. That is, selection of a peak as a specific member of set immediately determines the other peak position(s) for that set. This is explained as follows. When a peak position is selected as a first peak position within a set, it is associated with a first optical path. Thus, a triangle is formed with the detector 22 and the laser 14 along the unfolded first optical path. A distance to the target point can be calculated using triangulation. For that distance, there is a single unique point formed on the detector, resulting in a unique peak position, along the second optical path. Similarly, a unique peak position results for each of any number of optical paths. By verifying that a peak exists at the corresponding unique peak position, the selected peak position is validated as a "real" first peak position within a set. When the corresponding peak is not present, the selected peak position is not a "real" first peak position. Optionally, the same peak position is then selected as a second peak position within the set and a corresponding first peak position within the set is sought. Alternatively, a new peak position is selected as the first peak position and the process continues. For a single target point and two optical paths, a set of two peak positions that correspond to a same range measurement are eventually found and a single range measurement is determined from both peak locations. This increases precision of the determined range value as defined in Equations 1, 2, and 3.

A method of determining corresponding peak positions is an analytical method of determining a range and then finding the peak position along the other optical path based on the determined range. Alternatively, a mapping is determined, for example during calibration, and the unique mapping is used to find a corresponding position at which to seek a peak.

For a plurality of projected points, a further relation between projected points exists and can be exploited in order to validate range measurements. In an embodiment, when a line is projected, a series of similar range measurements falls along a straight line. Therefore, similar range measurements resulting from points not along one of the two straight lines allows elimination of those measurements from consideration. Also, determination of most likely peak positions for applying the validation steps is greatly simplified using the known correlations between points and previous "real" peak positions.

Referring again to FIG. 2b, the points 201 and 202 are correlated and their positions are a first peak position and a second peak position in a valid set of peak positions. Because of scaling, points 203 and 204 are also correlated though they are a different distance from points 201 and 202 respectively. Thus, even though each peak position has a corresponding peak position within a set, some pixels within the line 201–203 correlate to a same pixel within the line 202–204. This illustrates the effects of scaling.

The Biris system relies on a known relation between apertures—they are symmetric about the optical axis of the lens—to help validate peak positions. This same information is not available when using the present invention since symmetry is not assured. Ideally, for any range value determined from a peak position a unique set of two or more peak positions exists. When used in an uncontrolled environment, this is not a realistic expectation. Noise as well as other light sources result in extra peaks that do not correlate to an accurate range measurement. Therefore, validation is used. In an embodiment, the following steps are used to validate peak positions:

for each peak i located within a detected image, determine a pixel location where a corresponding second peak is expected using the calibration function w=G(P,v);
for each peak compute the error function;
retain the pair of peaks with the minimum quadratic error; and,
compensate for system distortions and compute the range information for the best combination z=Fz(Pi,v; Pj,v), X=Fx(z,v).

If this minimum quadratic error is greater than a given tolerance, no valid range measurement was obtained.

Because of the fixed arrangement of the optical components only one pair of peaks is likely to satisfy this algorithm when a single target point is projected onto the surface. Mathematical details of the algorithm are provided below. Together with this validation method the various embodiments of the range sensor according to the invention provide highly accurate and reliable range measurements.

Though the above description refers to optical paths providing imaging from two different viewing angles and a single CCD, it is also possible to implement the invention using two CCDs arranged as a stereoscopic imaging system. This further increases the value of d.

Simplified Mathematical Optical Model for a Range Sensor According to the Invention This section details a mathematical model of the ranging and validation procedure used according to the invention. The model describes the simplest case of a basic bi-view lens system. The method can be extended to N views and more complex configurations.

Figure 7:
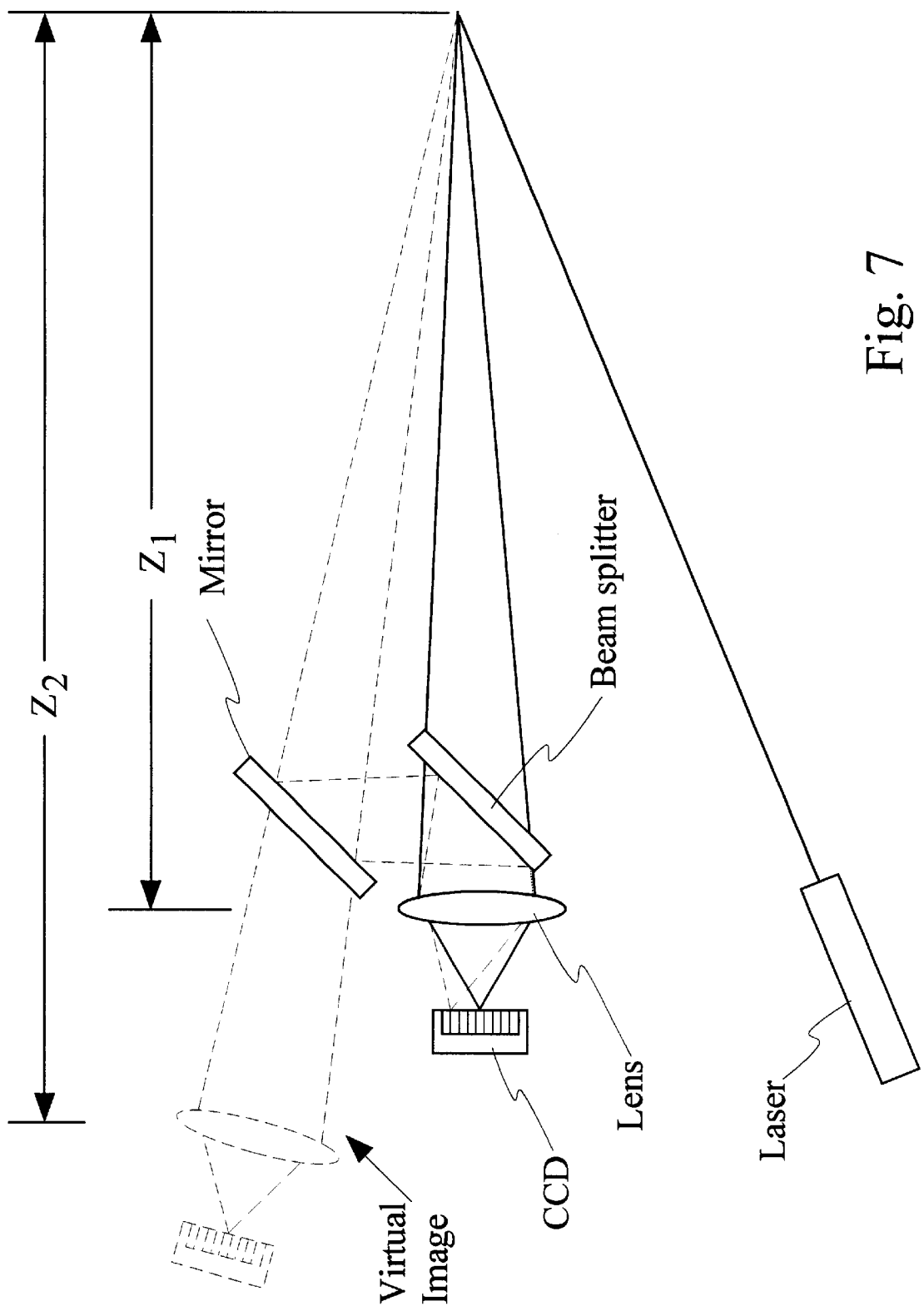
FIG. 7 illustrates a simplified diagram for use in explaining the mathematical calculations for use according to the invention.

According to FIG. 7, assuming a simple triangulation model and a pin-hole lens, the basic ranging equations are as follows:

$$z1 = \frac{D1 \cdot fo}{p1 + fo \cdot \tan(\delta 1)}$$

$$x1 = z1 \cdot \frac{v1}{fo}$$

p1 is the peak position on the CCD, D1 is the triangulation base, fo the equivalent focal length of the optical system, δ1 is the deflection angle of the laser beam, and v1 is the video line of the CCD. z1 is the distance from the object to the principal plane of the lens.

Projecting the range measurements onto the laser planes yields:

$$z = \frac{z1}{\cos(\gamma 1)} + zo1$$

$$z = \frac{D1 \cdot fo}{\cos(\gamma 1) \cdot (p1 + fo \cdot \tan(\delta))} + zo1$$

$$x = x$$

$$x = (z - zo1) \cdot \cos(\gamma 1) \cdot \frac{v1}{fo}$$

which simplifies to the basic form $$z = \frac{1}{a1 + b1 \cdot p1} + zo1$$

$$x = v1 \cdot c1 \cdot (z - zo1)$$

where a1, b1, and zo1 are constants. z is the range measurement and x is the lateral position in the laser plane. With this coordinate system y=0.

Similarly, for the second view we have $$z = \frac{1}{a2 + b2 \cdot p2} + zo2$$

$$x = v2 \cdot c2 \cdot (z - zo2)$$

Distorsion Compensation, System Calibration

The previous equations are valid only for the simple pin-hole camera system. In practice, however, lens distortion is included within the model to obtain accurate range information. Naturally a complex and detailed model of all distortions within the system is possible. A simpler and common practice uses Taylor series expansions to model lens aberrations. Using this simple method, the previous ranging equations become:

$$z = \frac{1}{\sum_{n=0}^{N-1} a_n \cdot p^n} + zo1$$

$$x = v1 \cdot c1 \cdot (z - zo1)$$

Expanding these aberrations to the full CCD array, we have the generalized model function $$Z1(p1, v1) = \frac{1}{\sum_{m=0}^{M-1}\sum_{n=0}^{N-1} \alpha 1_{m,n} \cdot p1^n \cdot v1^m} + zo1$$

$$X1(z1, v1) = \sum_{m=0}^{M-1} \beta 1_m \cdot v1^m \cdot (z1 - zo1)$$

and similarly for the second view, substituting $\alpha 1$, $p1$, $v1$, $\beta 1$, and $zo1$ with $\alpha 2$, $p2$, $v2$, $\beta 2$, and $zo2$.

$$Z2(p2, v2) = \frac{1}{\sum_{m=0}^{M-1}\sum_{n=0}^{N-1} \alpha 2_{m,n} \cdot p2^n \cdot v2^m} + zo2$$

$$X2(z2, v2) = \sum_{m=0}^{M-1} \beta 1_m \cdot v2^m \cdot (z2 - zo2)$$

Validation

Assuming one laser point projected on object, range z. We have the following relations:

$$Z1(p1,v1)=Z2(p2,v2)$$

and $$X1(z1,v1)=X2(z2,v2)$$

Solving the previous equations for p2 and v2 respectively, and expanding again the solutions to form a Taylor series gives the following approximations:

$$v2 = \sum_{j=0}^{J-1} \psi_j \cdot v1^j$$

$$p2 = \sum_{m=0}^{M-1}\sum_{k=0}^{K-1} \zeta_{m,k} \cdot v1^m \cdot p1^k$$

These functions being monotonic, for a given set of points pi, only one pair p1, p2 will satisfy the previous equation. With the Biris method we have, zo1=zo2 and v1=v2 therefore the method simplifies to processing the peaks for each video line v1, independently.

For the present invention, the search for the expected peak p2 is performed on video line v2, given by the previous equations.

Calibration and Ranging

Calibration consists of experimentally evaluating all parameters $\alpha$, $\beta$, $\psi$, $\zeta$, and zo, that are used to remove the distortions of the optical system.

Ranging is finally obtained by combining range measurements obtained from p1 and p2. Assuming uncorrelated noise:

$$z = \sqrt{\left(\frac{Z1(p1, v1)}{\sigma 1}\right)^2 + \left(\frac{Z2(p2, v2)}{\sigma 2}\right)^2}$$

Ranging is also obtainable from the measurement b=p2−p1, with a triangulation base of approximately d=D2−D1. Although there is no gain to validating the data using this measurement, correlated noise is reduced. Ranging then becomes $$z = \sqrt{\left(\frac{z(p1)}{\sigma 1}\right)^2 + \left(\frac{z(p2)}{\sigma 2}\right)^2 + \left(\frac{z(p2-p1)}{\sigma 21}\right)^2}$$

Of course, numerous other embodiments of the invention may be envisioned without departing from the spirit or scope of the invention.

What is claimed is:

1. A range sensor for measuring a range from the range sensor to a target point on a surface comprising:

a light source for projecting a target at the target point on the surface;

a detector for capturing an image;

a first optical path having a first optical axis for providing a first image of the target point to the detector the first image provided from a first viewing angle;

a second optical path having a second different optical axis for providing a second other image of the same target point to the detector from a different viewing angle such that the two different viewing angles enclose a sufficient angle to provide a large base for triangulation between two different range measurements;

a combining optical element for combining the first optical path and the second optical path into an approximately third optical path to redirect light travelling along the first optical path and light travelling along the second optical path along approximately a same optical path, the third optical path being incident upon the detector;

a processor for determining a distance measurement in dependence upon the two captured images, the distance measurement determined using at least two imaged target points, imaged target point positions used to determine a range measurement, the processor for validating the determined range measurement.

2. A range sensor as defined in claim 1 wherein the range sensor comprises at least a lens for focussing the first image and the second other image onto the detector.

3. A range sensor as defined in claim 2 wherein at least one of the at least a lens comprise a pinhole lens.

4. A range sensor as defined in claim 1 wherein the processor comprises means for executing suitably programmed instructions for performing the steps of: selecting a first detected target point position;

determining from the first detected target point position a corresponding position of another detected target point, the corresponding position of a target point imaged along a different optical path and relating to an approximately same determined range measurement;

determining a presence or absence of a target point at the corresponding position; and, when a target point is detected at the corresponding position, determining a range measurement from the two corresponding target point positions and validating the determined range measurement.

5. A range sensor as defined in claim 1 wherein the processor comprises means for executing suitably programmed instructions for performing the steps of:

a) selecting a first detected target point position;

b) determining from the first detected target point position a corresponding position of another detected target point, the corresponding position of a target point imaged along a different optical path and relating to an approximately same determined range measurement;

c) determining a presence or absence of a target point at the corresponding position;

d) when a target point is detected at the corresponding position, determining a range measurement from the two corresponding target point positions and validating the determined range measurement; and, when no target point is detected at the corresponding position, selecting a new first target point position and repeating steps (b), (c) and (d).

6. A range sensor for measuring a range from the range sensor to a target point on a surface comprising:

a light source for projecting a target at the target point on the surface;

a detector for capturing an image;

a first optical path having a first optical axis for providing a first image of the target point to the detector the first image provided from a first viewing angle;

a second optical path having a second different optical axis for providing a second image of the same target point to the detector from a different viewing angle such that the two different viewing angles enclose a sufficient angle to provide a large base for triangulation between two different range measurements;

a combining optical element for combining the first optical path and the second optical path into an approximately third optical path to redirect light travelling along the first optical path and light travelling along the second optical path along approximately a same optical path, the third optical path being incident upon the detector;

a lens for focussing the first image and the second image onto the detector;

a processor for determining a distance measurement in dependence upon a captured image, the distance measurement determined using at least two detected target points.

7. A range sensor as defined in claim 6 wherein a distance traveled by light within the first and the second optical path is approximately a same.

8. A range sensor as defined in claim 6 wherein the processor comprises means for validating the determined range.

9. A range sensor as defined in claim 6 wherein the processor comprises means for executing suitably programmed instructions for performing the steps of:

selecting a first detected target point having a position;

determining from the first detected target point position a corresponding position of another detected target point, the corresponding position of a target point imaged along a different optical path and relating to an approximately same determined range measurement;

determining a presence or absence of a target point at the corresponding position; and, when a target point is detected at the corresponding position, determining a range measurement from the two corresponding target point positions and validating the determined range measurement.

10. A range sensor as defined in claim 6 wherein the processor comprises means for executing suitably programmed instructions for performing the steps of:

a) selecting a first detected target point having a position;

b) determining from the first detected target point position a corresponding position of another detected target point, the corresponding position of a target point imaged along a different optical path and relating to an approximately same determined range measurement;

c) determining a presence or absence of a target point at the corresponding position;

d) when a target point is detected at the corresponding position, determining a range measurement from the two corresponding target point positions and validating the determined range measurement; and, when no target point is detected at the corresponding position, selecting a new first target point position and repeating steps (b), (c) and (d).

11. A range sensor as defined in claim 6 wherein the target consists of a single point of light.

12. A range sensor as defined in claim 6 wherein the target comprises a pattern of points of light.

13. A range sensor as defined in claim 12 wherein the pattern consists of one or more straight lines of light.

14. A method of determining a distance between a detector and a surface comprising the steps of:

projecting a target from a source onto the surface;

using a detector, imaging the target through two different optical paths, each optical path having a different optical axis, and wherein the two different optical paths are combined into an approximately third optical path to redirect light travelling along the two different optical paths along approximately a same optical path, the third optical path being incident upon the detector; and determining the distance to the surface based on the location of the source, the location of the detector, and the images of the target, the distance determined using triangulation.

15. A method as defined in claim 14 comprising the steps of detecting target point positions within an image captured with the detector;

selecting a first detected target point position;

determining from the first detected target point position a corresponding position of another detected target point, the corresponding position of a target point imaged along a different optical path and relating to an approximately same determined range measurement;

determining a presence or absence of a target point at the corresponding position; and, when a target point is detected at the corresponding position, determining a range measurement from the two corresponding target point positions and validating the determined range measurement.

16. A method as defined in claim 15 wherein corresponding peak positions are disposed on different scan lines of the imaged image.

17. A method as defined in claim 15 wherein corresponding peak positions are determined accounting for scaling resulting from differences in optical path lengths between the first optical path and the second optical path.

18. A method as defined in claim 15 wherein for a first target point position, a single unique position exists for another corresponding target point for validating a range determined from the first target point position, the target point position assumed detected along a first optical path.

19. A method as defined in claim 14 comprising the steps of a) detecting target point positions within an image captured with the detector;

b) selecting a first detected target point position;

c) determining from the first detected target point position a corresponding position of another detected target point, the corresponding position of a target point imaged along a different optical path and relating to an approximately same determined range measurement;

d) determining a presence or absence of a target point at the corresponding position;

e) when a target point is detected at the corresponding position, determining a range measurement from the two corresponding target point positions and validating the determined range measurement; and, when no target point is detected at the corresponding position, selecting a new first target point position and repeating steps (c), (d) and (e).

20. A method as defined in claim 19 wherein a new first target point position is selected in dependence upon a known target geometry and previously validated first target point positions.

21. A method as defined in claim 20 comprising the step of validating determined corresponding peak positions in dependence upon other corresponding peak positions and the known target geometry.

22. A method as defined in claim 19 wherein a range measurement is determined based on the two corresponding peak positions and the distance therebetween.

* * * * *